(12) United States Patent
Tang et al.

(10) Patent No.: US 12,079,412 B2
(45) Date of Patent: *Sep. 3, 2024

(54) SYSTEMS AND METHODS FOR PROVIDING AN INTERACTIVE USER INTERFACE USING A PROJECTOR

(71) Applicant: Capital One Services, LLC, McLean, VA (US)

(72) Inventors: Qiaochu Tang, The Colony, TX (US); Sunil Subrahmanyam Vasisht, Flowermound, TX (US); Stephen Michael Wylie, Carrollton, TX (US); Geoffrey Dagley, McKinney, TX (US); Micah Price, Plano, TX (US); Jason Richard Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,186

(22) Filed: Dec. 14, 2021

(65) Prior Publication Data

US 2022/0171490 A1    Jun. 2, 2022

Related U.S. Application Data

(63) Continuation of application No. 17/131,886, filed on Dec. 23, 2020, now Pat. No. 11,231,803, which is a
(Continued)

(51) Int. Cl.
*G06F 3/041* (2006.01)
*G06F 3/04845* (2022.01)
(Continued)

(52) U.S. Cl.
CPC ........ *G06F 3/0414* (2013.01); *G06F 3/04845* (2013.01); *G06F 3/0485* (2013.01); *G06F 3/04883* (2013.01)

(58) Field of Classification Search
CPC ...... B60K 2370/1529; B60K 2370/164; B60K 2370/165; B60K 2370/334;
(Continued)

(56) References Cited

U.S. PATENT DOCUMENTS 6,654,070 B1   11/2003   Rofe
8,606,430 B2   12/2013   Seder et al.
(Continued)

FOREIGN PATENT DOCUMENTS

WO    WO-2017066286 A1  *  4/2017   ........... B60R 25/245

OTHER PUBLICATIONS

Axon, "Sony's projector that turns your surface into a touchscreen is now available," Ars Technica, retrieved Apr. 28, 2018, from https://arstechnica.com/gadgets/2017/10/sonys-projector-that-turns-your-wall-into-a-touchscreen-is-now-available/ (2 pages).

*Primary Examiner* — Richard J Hong
(74) *Attorney, Agent, or Firm* — Finnegan, Henderson, Farabow, Garrett & Dunner LLP

(57) ABSTRACT

The present disclosure relates to interactive projection systems. In one implementation, an interactive projection system may include a surface having a plurality of sensors embedded therein, the plurality of sensors configured to detect local pressure disturbance on the surface; a projector configured to project a user interface onto the surface; and at least one processor. The at least one processor may be configured to perform operations, including receiving a detection of a local pressure disturbance from at least one of the plurality of sensors, based on a location of the detected local pressure disturbance, determining a change in the user interface, and transmitting a command to the projector to modify a projected user interface according to the determined change.

14 Claims, 13 Drawing Sheets

Related U.S. Application Data continuation of application No. 16/165,711, filed on Oct. 19, 2018, now Pat. No. 10,908,725, which is a continuation of application No. 15/915,301, filed on Mar. 8, 2018, now Pat. No. 10,761,636.

(51) Int. Cl.
*G06F 3/0485* (2022.01)
*G06F 3/04883* (2022.01)

(58) Field of Classification Search
CPC ........ B60K 2370/589; B60K 2370/785; B60K 35/00; G06F 3/03547; G06F 3/0414; G06F 3/04144; G06F 3/0426; G06F 3/04845; G06F 3/0485; G06F 3/04883; G06F 3/04847; G06F 3/0488; G07C 9/00309; G07C 5/008; G07C 5/085; H04W 4/023; B60W 30/06; B60R 25/245; B60R 25/24; B60C 23/0479; G06Q 30/0251; G06Q 30/0631
See application file for complete search history.

(56) References Cited

U.S. PATENT DOCUMENTS

| | | | | |
|---|---|---|---|---|
| 8,886,392 | B1* | 11/2014 | Maeng | G07C 5/085 701/34.2 |
| 2006/0145825 | A1 | 7/2006 | McCall | |
| 2007/0239535 | A1* | 10/2007 | Koran | G06Q 30/0251 705/14.25 |
| 2008/0001931 | A1* | 1/2008 | Szczerba | G06F 3/04847 345/184 |
| 2010/0075656 | A1 | 3/2010 | Howarter et al. | |
| 2011/0112717 | A1* | 5/2011 | Resner | G07C 5/008 701/31.4 |
| 2012/0253930 | A1* | 10/2012 | Gao | G06Q 30/0251 705/14.53 |
| 2013/0006775 | A1 | 1/2013 | Jordan et al. | |
| 2013/0090783 | A1* | 4/2013 | Katou | B60R 25/24 701/2 |
| 2013/0307706 | A1 | 11/2013 | Kriezman | |
| 2013/0344859 | A1 | 12/2013 | Abramson et al. | |
| 2014/0092058 | A1 | 4/2014 | Xiao et al. | |
| 2015/0077235 | A1 | 3/2015 | Pisz et al. | |
| 2015/0180999 | A1 | 6/2015 | Pisz | |
| 2015/0220991 | A1 | 8/2015 | Butts et al. | |
| 2015/0278909 | A1* | 10/2015 | Bax | G06Q 30/0631 705/26.7 |
| 2015/0329121 | A1 | 11/2015 | Lim et al. | |
| 2015/0332532 | A1 | 11/2015 | Lee et al. | |
| 2015/0371579 | A1 | 12/2015 | Yu et al. | |
| 2016/0023665 | A1 | 1/2016 | Sherony et al. | |
| 2016/0179276 | A1 | 6/2016 | Nathan et al. | |
| 2016/0306350 | A1* | 10/2016 | Shim | G07C 9/00309 |
| 2016/0306455 | A1 | 10/2016 | Buttolo et al. | |
| 2017/0040002 | A1 | 2/2017 | Basson et al. | |
| 2017/0060130 | A1 | 3/2017 | Kim et al. | |
| 2017/0237945 | A1* | 8/2017 | Murar | B60K 35/00 348/148 |
| 2017/0278326 | A1 | 9/2017 | DeCia et al. | |
| 2018/0234797 | A1* | 8/2018 | Ledvina | H04W 4/023 |
| 2018/0339651 | A1 | 11/2018 | Salter et al. | |
| 2019/0137990 | A1* | 5/2019 | Golgiri | B60W 30/06 |
| 2019/0152472 | A1* | 5/2019 | Aksyutina | B60W 30/06 |
| 2019/0225034 | A1* | 7/2019 | Van Wiemeersch | B60C 23/0479 |
| 2020/0257442 | A1* | 8/2020 | Strandberg | G06F 3/0488 |

\* cited by examiner

SYSTEMS AND METHODS FOR PROVIDING AN INTERACTIVE USER INTERFACE USING A PROJECTOR

This application is a continuation of U.S. application Ser. No. 17/131,886, filed Dec. 23, 2020, now U.S. Pat. No. 11,231,803, which is a continuation of U.S. application Ser. No. 16/165,711, filed Oct. 19, 2018, now U.S. Pat. No. 10,908,725, which is a continuation of U.S. application Ser. No. 15/915,301, filed Mar. 8, 2018, now U.S. Pat. No. 10,761,636, the disclosures of which are incorporated herein by reference in their entireties.

TECHNICAL FIELD

This disclosure relates generally to the field of interactive user interfaces. More specifically, and without limitation, this disclosure relates to systems and methods for providing an interactive interface using a film and projector.

BACKGROUND

There are many instances in which an interactive touchscreen may be used to replace a stationary sign, such as a retail display, an informational kiosk, or the like. However, there are environments in which a touchscreen is too bulky or heavy to effectively replace a stationary sign. For example, automobile dealerships use paper adhered to vehicle windows to convey information to potential consumers. Such paper may be easily ripped or defaced, and can only display a limited amount of information. A touchscreen would be advantageous as it would enable the display of more (and more dynamic) information. However, an interactive touchscreen may be unsuitable for adherence to vehicle windows on account of the weight of the touchscreen, which may require a strong adhesive that may be damaging to the vehicle window.

In another example, a seller for a home may use paper on a for sale sign to convey information to potential consumers. However, an interactive touchscreen may be unsuitable for this use on account of its sensitivity to the elements, such as rain, snow, or the like.

SUMMARY

Disclosed systems and methods for generating a user interface using a film and projector and enabling interaction with the generated interface. Accordingly, disclosed systems and methods result in an improved user interface over extant projected interfaces, which are generally static. Moreover, disclosed systems and methods may allow for selective power control and interface generation along with dynamic interface generation to incorporate customization. Accordingly, disclosed systems and methods result in a more energy-efficient system along with an improved user interface over extant projected interfaces, which are generally generic. Finally, disclosed systems and methods may allow for dynamic interface generation and/or power control to allay privacy concerns. Accordingly, disclosed systems and methods use a technical solution to solve privacy concerns that inhere in the use of customized interfaces.

There are many possible applications for such capabilities. Examples of applications include use on vehicle windows, e.g., in the context of an automobile dealership. Additional examples of application may include use on for sale signs for property, e.g., in the context of home sales.

According to an exemplary embodiment of the present disclosure, an interactive projection system for a vehicle window may comprise a film having a plurality of sensors embedded therein, the plurality of sensors configured to detect local pressure disturbance on the film, a projector configured to project a user interface onto the film, and at least one processor. The at least one processor may be configured to perform operations that may comprise receiving a detection of a local pressure disturbance from at least one of the plurality of sensors; based on a location of the detected local pressure disturbance, determining a change in the user interface; and transmitting a command to the projector to modify a projected user interface according to the determined change.

According to another embodiment of the present disclosure, an interactive projection system for a vehicle window may comprise a film having a plurality of sensors embedded therein, a projector configured to project onto the film, and at least one processor. The plurality of sensors may be configured to detect local pressure disturbance on the film. The at least one processor may be configured to perform operations that may comprise generating a user interface; transmitting a command to the projector to project a user interface onto the film; receiving pressure measurements from at least one of the plurality of sensors; determining that the pressure measurements are indicative of a particular motion; based on the determination, generating an animation for the user interface; and transmitting a plurality of commands to the projector to project the animation of the user interface.

According to an exemplary embodiment of the present disclosure, an interactive projection system for a vehicle window may comprise a film, a projector configured to project a user interface onto the film, and at least one processor. The film may have a plurality of sensors embedded therein, the plurality of sensors configured to detect local pressure disturbance on the film; a wireless communications device embedded therein; and at least one microprocessor embedded therein and configured to receive pressure measurements from at least one of the plurality of sensors and transmit, using the wireless communications device, the received pressure measurements. The at least one processor may be configured to perform operations that may comprise receiving the pressure measurements from the wireless communications device; determining a local pressure disturbance based on the received pressure measurements; based on a location of the determined local pressure disturbance, determining a change in the user interface; and transmitting a command to the projector to modify a projected user interface according to the determined change.

According to another embodiment of the present disclosure, an interactive projection system for a vehicle window may comprise a film, a projector configured to project a user interface onto the film, and at least one processor. The at least one processor may be configured to perform operations that may comprise receiving an indication of proximity of a mobile device associated with a user; in response to the indication of proximity, generating the user interface; and transmitting a command to the projector to project the generated user interface.

According to an exemplary embodiment of the present disclosure, an interactive projection system for a vehicle window may comprise a film, a projector adapted to have a power on mode and a low power mode, and at least one processor. The at least one processor may be configured to perform operations that may comprise receiving an indication of proximity of a mobile device; in response to the indication of proximity, transmitting a command to the projector to switch from the low power mode to the power on mode; generating the user interface; and transmitting a command to the projector to project the generated user interface.

According to another embodiment of the present disclosure, an interactive projection system for a vehicle window may comprise a film, a projector, and at least one processor. The at least one processor may be configured to perform operations that may comprise receiving an indication of proximity of a mobile device; in response to the indication of proximity, transmitting a command to the projector to power on; generating the user interface; transmitting a command to the projector to project the generated user interface; receiving an indication that the mobile device is beyond a proximity threshold; and in response to the indication that the mobile device is beyond the proximity threshold, transmitting a command to the projector to power off.

Additional embodiments of the present disclosure include non-transitory computer-readable media storing instructions that cause one or more processors to execute any of the methods disclosed herein.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
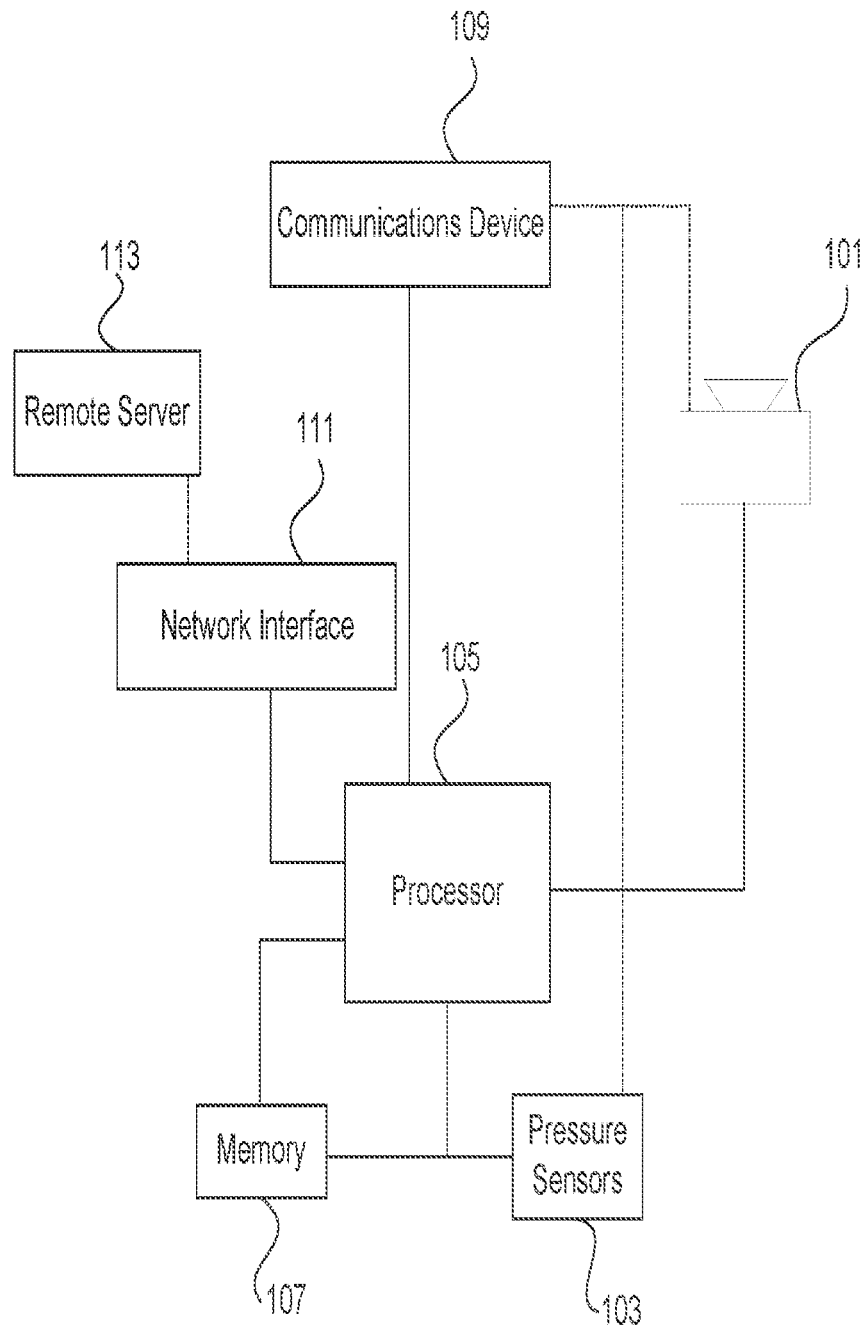
FIG. 1 is a schematic representation of an example interactive projection system, consistent with embodiments of the present disclosure.

The disclosed embodiments relate to systems and methods for providing an interactive interface using a film and projector. Embodiments of the present disclosure may be implemented using a film, a projector, and at least one processor, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively or concurrently, the at least one processor may comprise one or more special-purpose devices built according to embodiments of the present disclosure using suitable circuit elements, e.g., one or more application-specific integrated circuits (ASICs), field-programmable gate arrays (FPGAs), or the like.

According to an aspect of the present disclosure, an interactive projection system may comprise a film, a projector, and at least one processor. For example, the film may comprise any material configured to reflect light projected from at least one angle away from the film. The film may be lightweight. For example, it may comprise one or more plastics.

In some embodiments, the film may include one or more components embedded therein. For example, the film may have a plurality of sensors embedded therein. The sensors may comprise pressure sensors, such as piezoelectric sensors, capacitive sensors, electromagnetic sensors, optical pressure sensors, potentiometric sensors, or the like. The plurality of sensors may be configured to detect local pressure disturbance on the film and/or generate pressure measurements. For example, the sensors may be configured to detect the local pressure disturbance (and/or generate pressure measurements) based on a change in an electrical property of the sensors. The electrical property may comprise at least one of resistance, inductance, or capacitance. In another example, the sensors may be configured to detect the local pressure disturbance (and/or generate pressure measurements) based on a change in an optical property of the sensors.

Additionally or alternatively, the film may further include a wireless communications device embedded therein. The wireless communications device may comprise a network interface controller (NIC) configured to communication over one or more computer networks. For example, the NIC may communicate over a cellular network (such as Global System for Mobile Communications (GSM), Code-division multiple access (CDMA), General Packet Radio Service (GPRS), one or more 3G networks such as Enhanced Data rates for GSM Evolution (EDGE) or CDMA2000, one or more 4G networks such as International Mobile Telecommunications Advance (IMT-Advance), Long Term Evolution (LTE), Wi-Fi, or the like). Accordingly, the communications device may be configured to communicate a detection from at least one sensor to at least one processor.

Additionally or alternatively, one or more of the plurality of sensors may communicate detections and/or pressure measurements via a wireless frequency. For example, the one or more of the plurality of sensors may have one or more antennae configure to enable communication on the wireless frequency, such as a radio frequency.

Additionally or alternatively, the film may further include at least one microprocessor embedded therein. The at least one microprocessor may be communicatively coupled, through one or more wired and/or wireless connections, to one or more of the sensors embedded in the film. Accordingly, the at least one microprocessor may be configured to receive pressure measurements from at least one of the plurality of sensors. In embodiments having an embedded wireless communications device, the at least one microprocessor may also transmit, using the wireless communications device, the received pressure measurements to at least one remote processor.

The projector may comprise any optical device configured to shine light onto a surface. For example, the projector may use one or more light bulbs, one or more lasers, or any combination thereof, in order to generate the light. In some embodiments, the projector may further comprise a focusing device (e.g., one or more lenses). The light may be generated according to one or more inputs to the projector, e.g., in order to form an image or a series of images. Accordingly, the projector may be configured to project a user interface onto the film.

The at least one processor may comprise at least one microprocessor embedded in the film (as described above). Accordingly, any steps performed by the at least one processor described below may be performed by at least one microprocessor at least one processor remote from the film. Additionally or alternatively, the at least one processor may encased within a housing with the projector. For example, the housing may comprise a shell formed of plastic and/or metal to include the projector and the at least one processor.

In one embodiment, the at least one processor may be configured to receive a detection of a local pressure disturbance from at least one of the plurality of sensors. For example, as explained above, the at least one processor may receive the detection via a wired connected to one or more of the plurality of sensors and/or via a wireless connection to one or more of the plurality of sensors.

Additionally or alternatively, the at least one processor may be configured to receive pressure measurements from the wireless communications device. For example, as explained above, the at least one processor may receive the measurements via a wired connected to one or more of the plurality of sensors and/or via a wireless connection to one or more of the plurality of sensors. In addition, the at least one processor may be further configured to determine a local pressure disturbance based on the received pressure measurements. For example, the at least one processor may determine a location of the disturbance, as explained below. In addition, the at least one processor may determine changes in the location over a period of time, as explained below.

The at least one processor may be further configured to, based on a location of the detected local pressure disturbance, determine a change in a user interface. For example, the at least one processor may determine a popup window to be generated if the location is within one or more regions of the film. In another example, the at least one processor may determine a new user interface to be generated if the location is within one or more regions of the film. In yet another example, the at least one processor may determine no change if the location is within one or more regions of the film.

In certain aspects, the detection may be monitored for changes (or for the lack thereof) across a period of time and/or across locations of the film. In such aspects, the determined change may be further based on the monitored change and/or the magnitude of the period of time. For example, the at least one processor may determine a popup window to be generated if the detection remains in the same location for a threshold period of time. In another example, the at least one processor may determine a new user interface to be generated if the location of the detection moves across the film in one or more patterns.

The location may be determined based on indexing the at least one sensor from which the detection was received to one or more known locations of the at least one sensor. For example, the detection may include a stamp identifying the sensor from which it originated. The stamp may have been added by the sensor or by a readout circuit connected to the sensors and may include a number (e.g., a hexadecimal code, an integer number, or the like) identifying the sensor from which the detection originated. Accordingly, the at least one processor may map the identifier in the stamp to one or more variables indicating location on the film, e.g., via a relational database. Alternatively, the readout circuit may perform this mapping and additionally or alternatively include the location on the stamp. For example, the at least one processor may determine that the location of the detection is near point P if the sensor that sent the detection is located at point P.

If the detection is received from two or more sensors, the at least one processor may interpolate a location based on indexing one sensor from which the detection was received to a first known location and another sensor from which the detection was received to a second known location. For example, the at least one processor may perform an average (or weighted average where the weight is based on a magnitude of each detection received) of the first known location and second known location. Moreover, if the detection is received from three or more sensors, the at least one processor may use a localization algorithm, such as triangulation, to determine the location.

Additionally or alternatively, the at least one processor may receive the location with the detection. For example, the at least one processor may receive the location from one or more microprocessors coupled to the sensors and configured to interpolate a location from one or more detections received from the sensors (e.g., using any of the techniques discussed above) and send the location with the detection(s) to the at least one processor. Accordingly, in some embodiments, the at least one microprocessor may also perform monitoring of changes of the detections, as described above, and send the monitored changes to the at least one processor.

The at least one processor may be further configured to transmit a command to the projector to modify a projected user interface according to the determined change. For example, the at least one processor may send one or more graphics comprising a user interface incorporating the determined change to the projector. The one or more graphics may be sent via a wired connection to the projector and/or via a wireless connection to the projector.

In one embodiment, at least one processor may be configured to generate a user interface. For example, the at least one processor may generate one or more graphics and may layer the one or more graphics to form the user interface. The at least one processor may retrieve the one or more graphics from one or more memories (e.g., a volatile memory such as a random access memory (RAM) or a non-volatile memory such as a hard disk drive or flash memory).

The at least one processor may be further configured to transmit a command to the projector to project a user interface onto the film. For example, as explained above, the at least one processor may send the one or more graphics comprising the user interface to the projector. The one or more graphics may be sent via a wired connection to the projector and/or via a wireless connection to the projector.

The at least one processor may be further configured to receive pressure measurements from at least one of the plurality of sensors. For example, as explained above, the at least one processor may receive the measurements via a wire connected to one or more of the plurality of sensors and/or via a wireless connection to one or more of the plurality of sensors.

The at least one processor may be further configured to determine that the pressure measurements are indicative of a particular motion. For example, the at least one processor may map locations of the measurements (determined, for example, as described above) to one or more known patterns. In addition, the at least one processor may map changes (or lack thereof) in location over a period of time to one or more known patterns. For example, the at least one processor may use a database mapping identifiers of particular motions to one or more features of the motions, such as a spatial and/or temporal pattern formed by the plurality of locations over time.

The at least one processor may be further configured to, based on the determination, generate an animation for the user interface. For example, the at least one processor may determine a zooming animation to be generated if the measurements are indicative of a double-tap by a user (e.g., two pressure distortions nearby in time and location), a pinch-and-zoom by a user (e.g., two simultaneous pressure distortions in different locations that move together or apart over time), or the like. In another example, the at least one processor may determine a scrolling animation to be generated if the measurements are indicative of a scrolling motion (e.g., a single pressure distortion moving in a substantially vertical direction) or the like.

The at least one processor may be further configured to transmit a plurality of commands to the projector to project the animation of the user interface. For example, the animation may comprise one or more frames, each frame having one or more graphics forming a user interface, the frames arranged to create the appearance of motion when projected in a sequence in rapid (e.g., 15 frames per second, 30 frames per second, or the like) succession.

In one embodiment, at least one processor may be configured to receiving an indication of proximity of a mobile device. For example, the at least one processor may receive global positioning system (GPS) coordinates and/or other positional indicators (such as received signal strength, time of arrival one or more network signals at the mobile device, angle of arrival of one or more network signals at the mobile device, or the like) from which the at least one processor may determine a location of the mobile device. Alternatively, the mobile device may calculate its own location and send the location directly to the at least one processor.

The at least one processor may be further configured to generate a user interface. For example, the at least one processor may generate one or more graphics and may layer the one or more graphics to form the user interface. The at least one processor may retrieve the one or more graphics from one or more memories. In some embodiments, the at least one processor may generate the user interface also in response to the indication of proximity.

The at least one processor may be further configured to transmit a command to the projector to project the generated user interface. For example, as explained above, the at least one processor may send the one or more graphics comprising the user interface to the projector. The one or more graphics may be sent via a wired connection to the projector and/or via a wireless connection to the projector. In some embodiments, the at least one processor may transmit the command also in response to the indication of proximity.

Additionally or alternatively, the at least one processor may be further configured to, in response to the indication of proximity, transmit a command to the projector to switch from the low power mode to the power on mode. For example, the at least one processor may send the command via a wired connection to the projector and/or via a wireless connection to the projector.

Additionally or alternatively, the at least one processor may be further configured to, in response to the indication of proximity, transmit a command to the projector to power on. For example, the at least one processor may send the command via a wired connection to the projector and/or via a wireless connection to the projector.

The at least one processor may be further configured to receive an indication that the mobile device is beyond a proximity threshold. The proximity threshold may comprise, for example, a shortest distance threshold, a Lebesgue distance, a distance along a single axis, or the like. For example, the at least one processor may receive updated GPS coordinates and/or other updated positional indicators (such as received signal strength, time of arrival of one or more network signals at the mobile device, angle of arrival of one or more network signals at the mobile device, or the like) from which the at least one processor may determine an updated location of the mobile device. Alternatively, the mobile device may calculate its own updated location and send the location directly to the at least one processor. The at least one processor may then determine whether the updated location is outside a particular threshold (e.g., more than 10 meters from a particular location, more than 20 feet from a particular location, or the like). The particular threshold may comprise the proximity threshold. Moreover, the proximity threshold may vary by direction, e.g., 10 feet in a plurality of directions (e.g., defined by an angle range) and yet 30 feet in another plurality of directions (e.g., defined by a different angle range). Thus, the at least one processor may react to mobile devices approaching a front of the film with a proximity threshold that is relaxed compared to that for mobile devices approaching a back of the film.

The at least one processor may be further configured to, in response to the indication that the mobile device is beyond the proximity threshold, transmit a command to the projector to power off. For example, the at least one processor may send the command via a wired connection to the projector and/or via a wireless connection to the projector.

In any of the embodiments above, the at least one processor may be further configured to receive one or more indicators of interest associated with the mobile device. For example, the at least one processor may receive the indicators from one or more applications running on the mobile device. Additionally or alternatively, the at least one processor may use an authorization obtained from the mobile device to retrieve the indicators form one or more remote servers.

The at least one processor may be further configured to generate a customized user interface based on the one or more indicators. For example, the at least one processor may select and/or organize one or more graphics (and/or text) comprising the customized user interface to prioritize graphics and text aligned with the indicators of interest. For example, the at least one processor may map the indicators of interest to one or more predetermined profiles having one or more characteristics and may select the graphics and text using a relational database indexing characteristics to graphics and text. Additionally or alternatively, the at least one processor may determine strength scores for each indicator of interest and then organize the selected graphics and text to prioritize those matching indicators with the highest scores.

The at least one processor may be further configured transmit a command to the projector to project the customized user interface. For example, the at least one processor may send the command via a wired connection to the projector and/or via a wireless connection to the projector.

In such embodiments, the at least one processor may be further configured to determine one or more automotive preferences based on the one or more indicators. For example, as explained above, the indicators may be mapped to one or more automotive preferences, e.g., using a relational database and/or feature model. For example, an automotive preference may comprise one or more characteristics of a user that may influence a vehicle purchase, such as liking outdoors, caring for the environment, having a job as a contractor, or the like. Accordingly, generating the customized user interface may be based on the one or more automotive preferences, similar to the generation based on the indicators explained above.

Additionally or alternatively, the at least one processor may be further configured to receiving an indication that the mobile device is beyond a proximity threshold, as explained above, or may receive a second indication of proximity of a second mobile device (e.g., the at least one processor may receive GPS coordinates and/or other positional indicators from which the at least one processor may determine a location of the second mobile device, or may receive the location directly from the second mobile device and may then determine whether the location of the second mobile device is within a particular threshold that may comprise the proximity threshold). In response to the indication that the mobile device is beyond the proximity threshold and/or receiving the second indication, the at least one processor may generate a default user interface and transmit a command to the projector to replace the customized user interface with the default user interface. For example, the at least one processor may send the command via a wired connection to the projector and/or via a wireless connection to the projector.

Embodiments of the present disclosure also relate to methods and computer-readable media that implement the above embodiments.

Reference will now be made in detail to exemplary embodiments and aspects of the present disclosure, examples of which are illustrated in the accompanying drawings.

FIG. 1 is a schematic representation of example interactive projection system 100. As depicted in FIG. 1, system 100 may include a projector 101 in communication with a processor 105 (e.g., via a wired connection). Additionally or alternatively, projector 101 may communicate with a communications device 109 (e.g., via a wired connection and/or a wireless connection). Projector 101 may be configured to project a user interface onto a film (not shown).

As further depicted in FIG. 1, system 100 may include one or more pressure sensors 103. For example, sensors 103 may be embedded within the film (not shown). Sensors 103 may be in communication with processor 105 to transmit pressure measurements. Additionally or alternatively, sensors 103 may communicate with communications device 109 (e.g., via a wired connection and/or a wireless connection) to transmit pressure measurements.

Processor 105 and/or sensors 103 may further be in communication with memory 107. For example, memory 107 may store the pressure measurements from sensors 103 and/or data from processor 105.

As further depicted in FIG. 1, system 100 may further include a network interface 111 in communication with processor 105. For example, network interface 111 may communicate (e.g., via a wired connection and/or a wireless connection) with one or more remote servers (such as remote server 113).

Figures 2A, 2B:
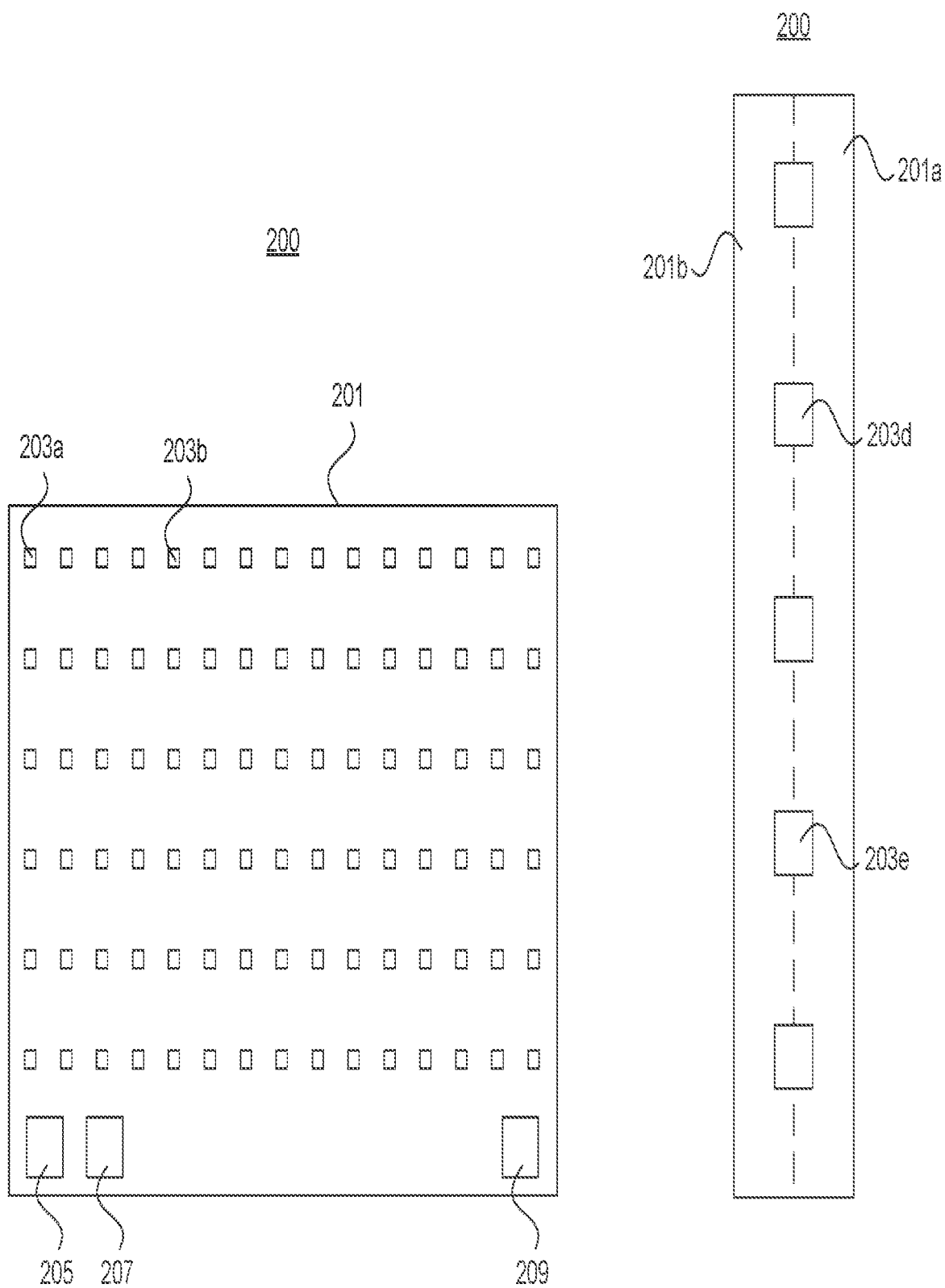
FIG. 2A is a schematic representation of an example film for an interactive projection system, consistent with embodiments of the present disclosure.
FIG. 2B is a schematic representation of a cross-sectional view of the film of FIG. 2A.

FIG. 2A is a schematic representation of example film 200. Example film 200 may be used in, for example, interactive projection system 100 of FIG. 1. Although depicted as a rectangle, film 200 may be formed in any appropriate shape, such as square, parallelogram, rhombus, circular, oval, elliptical, or the like.

As depicted in FIG. 2A, film 200 may include one or more embedded sensors (e.g., sensors 203a and 203b). Although the sensors of FIG. 2A are depicted as arranged in a rectangular array, the sensors may be arranged in any appropriate shape, such as a square, a parallelogram, a rhombus, a circle, an oval, an ellipse, or the like. The sensors may be arranged in a shape matching the shape of the film or differing from the shape of the film. Although not depicted in FIG. 2A, one or more of the sensors may be wired together to communicate with each other and/or in series along rows and/or columns. Additionally or alternatively, one or more of the sensors may include antennae to communicate with each other.

In some embodiments, the sensors (e.g., sensors 203a and 203b) may be wired together in a ring topology such that each sensor passes messages (or measurements or detections) to one or more neighbors downstream on the ring through one or more designated downstream ports until the messages return to the originating node. Alternatively, the sensors (e.g., sensors 203a and 203b) may be wired together in a linear topology such that messages are passed back to a given node's one or more upstream neighbors through one or more designated upstream ports. Alternatively, the sensors (e.g., sensors 203a and 203b) may be wired together in a bus topology such that sensors are configured to detect, avoid, and/or recover from communication collisions. In such embodiments, the sensors (e.g., sensors 203a and 203b) may be governed by a bus arbiter device (not depicted) that prohibits communication unless elicited. Alternatively, the sensors (e.g., sensors 203a and 203b) may be configured in a star topology to a master controller such that communication does not need to be arbitrated.

In any of the embodiments described above, the networks may be arranged such that each sensor on a given row is on the same network and/or such that each sensor on a given column is on the same network. Accordingly, the networks may be arranged such that each row is tied to a common cathode or anode and/or each column is tied to the opposite (anode or cathode). In such embodiments, one row and/or one column may activate at a time. Alternatively, the networks may be arranged in a "charlieplexed" manner such that only one sensor is active at a time based on wiring each sensor to different general-purpose input/output (GPIO) pins of a processor (e.g., processor 205, described below), and then drawing one GPIO pin high and another GPIO pin low such that current flow only occurs through one sensor. In any of the embodiments listed above, the sensors may comprise diodes.

In some embodiments, the sensors (e.g., sensors 203a and 203b) may communicate using a protocol, such as Recommended Standard 232 (RS-232) or the like, involving transmission and receive (TX & RX) functionality at a predetermined, pre-configured rate. Alternatively, the sensors (e.g., sensors 203a and 203b) may communicate using a master/slave protocol, such as Inter-Integrated Circuit (I2C), Dallas 1-Wire, or the like, in which data and a governing clock signal are sent along one or more wires, and slave sensors are activated by the master (e.g., a master sensor or processor 205, described below) by their identifiers, thus keeping communication in sync. Alternatively, the sensors (e.g., sensors 203a and 203b) may communicate along a protocol that uses a single wire for TX and a single wire for RX. For example, the sensors may communicate using a protocol involving differential signaling such that two inverted signals are sent along two different wires, in order to prevent against spurious electromagnetic noise.

In some embodiments, as depicted in FIG. 2A, the film may further include a microprocessor 205 and a wireless communications device 207 embedded therein. Although not depicted in FIG. 2A, microprocessor 205 and wireless communications device 207 may be wired together and/or with one or more sensors. Additionally or alternatively, microprocessor 205 and/or wireless communications device 207 may include antennae to communicate with each other and/or with one or more sensors.

In some embodiments, as further depicted in FIG. 2A, the film may further include a focusing assistant 209. For example, focusing assistant 209 may comprise a beacon that transmits (e.g., wirelessly or by using wireless communications device 207) a signal to a projector to assist the projector with projecting onto the film. For example, the signal may include an indicator of orientation of the film. Accordingly, the beacon may comprise a magnetometer, a geomagnetic field sensor, or any other positional sensor, or a combination thereof. The signal may further include an indicator of size of the film. For example, the signal may indicate the total dimensions of the film, a center point of the film, a focal point of the film, or the like.

Additionally or alternatively, focusing assistant 209 may comprise a registration mark having a particular pattern. The projector may capture an image of the registration mark before projection and analyze the image to determine an orientation of the film. Based on the determined orientation and known properties of the film (such as the dimensions of the film, the placement of the registration mark on the film, a focal point of the film, or the like), the projector may project onto the film.

FIG. 2B is a schematic representation of a cross-section of example film 200. As depicted in FIG. 2B, film 200 may include a first layer 201a and a second layer 201b that are affixed to each other, e.g., via an adhesive, via lamination, or the like. Moreover, the one or more sensors of film 200 (e.g., sensors 203d and 203e) may be embedded between first layer 201a and second layer 201b. Alternatively, first layer 201a and second layer 201b may be formed integrally with the one or more sensors therebetween.

Figure 3:
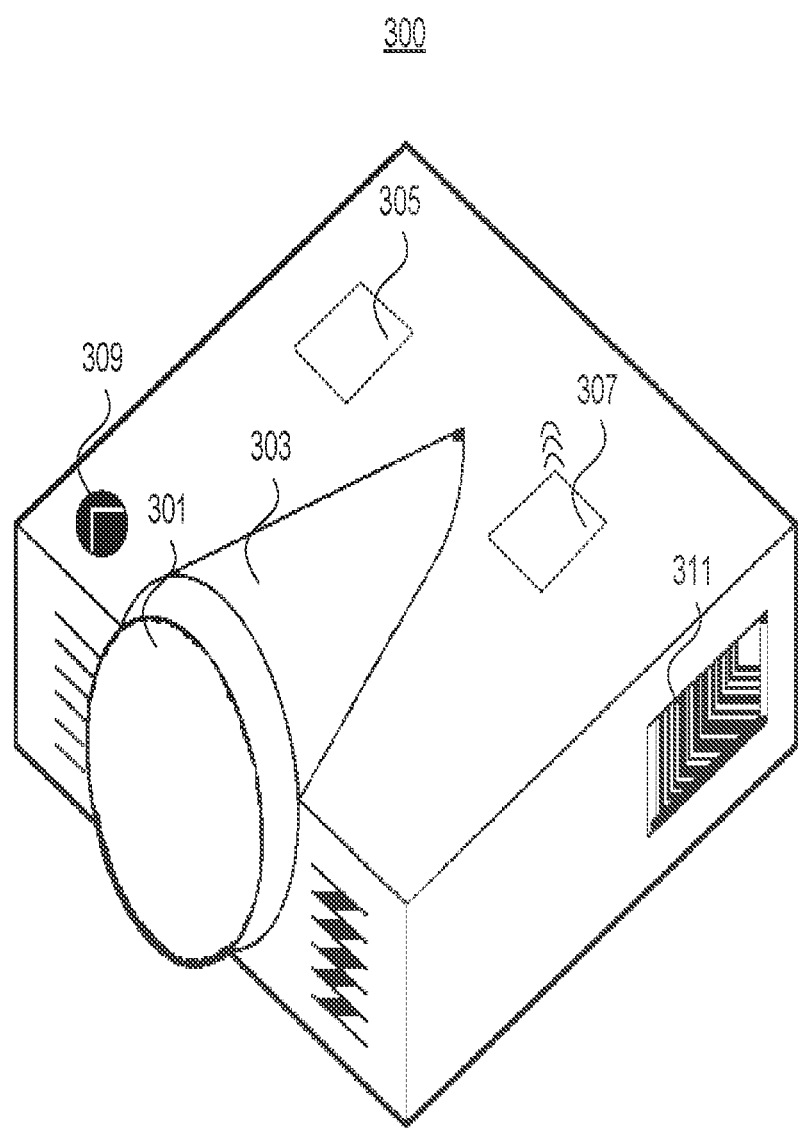
FIG. 3 is a schematic representation of an example projector for an interactive projection system, consistent with embodiments of the present disclosure.

FIG. 3 is a schematic representation of example projector 300. Example projector 300 may be used in, for example, interactive projection system 100 of FIG. 1. Although depicted as using a bulb-based illumination system, projector 300 may additionally or alternatively use a laser-based illumination system.

As depicted in FIG. 3, projector 300 may include an illumination system 303 (e.g., one or more bulbs) and a focusing system 301 (e.g., including one or more lenses). In embodiments where illumination system 303 is laser-based, projector 300 may lack focusing system 301 because the laser(s) may be self-focusing.

In some embodiments, projector 300 may further include a processor 305 and/or a wireless communications device 307. For example, processor 305 may perform one or more steps of the methods disclosed herein and/or may process received graphics into images for projection. Wireless communications device 307 may communicate over one or more wireless networks.

As further depicted in FIG. 3, projector 300 may include a power control 309 (e.g., a button or switch) and/or a ventilation system 311. In embodiments where projector 300 uses one or more low-powered lasers as illumination system 303, projector 300 may lack ventilation system 311 as the cooling therefrom may not be necessary.

Figure 4A:
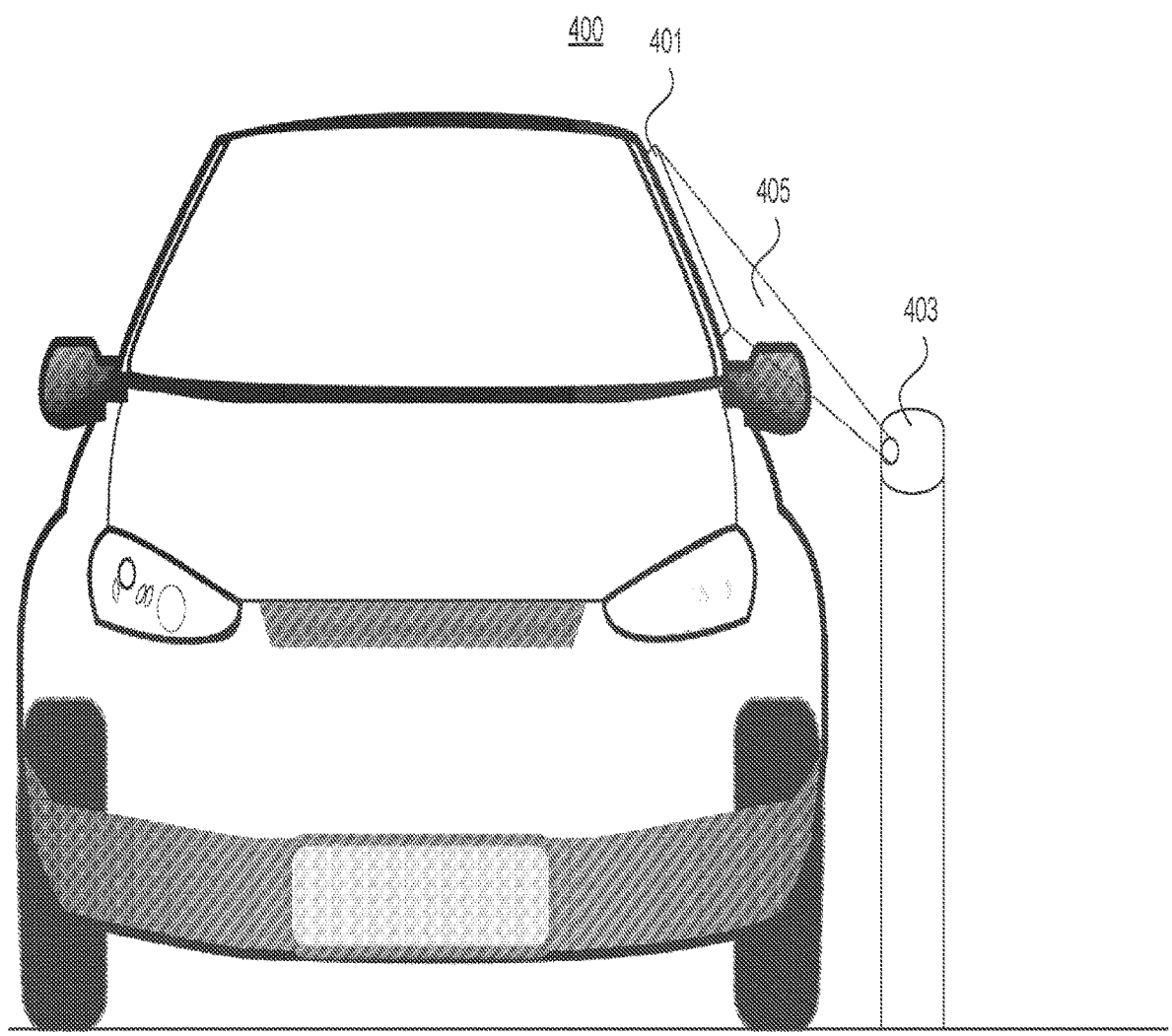
FIG. 4A is a schematic representation of an exemplary interactive projection system used on a vehicle window, consistent with embodiments of the present disclosure.

FIG. 4A is a schematic representation of an example interactive projection system 400 used on a vehicle window. As depicted in FIG. 4A, film 401 is affixed to a vehicle window. Projector 403 may then be configured to project to film 401. As depicted in FIG. 4A, projector 403 may be configured to project an image 405 onto a surface that is not fully perpendicular to the plane of the projector. Accordingly, a processor of projector 403 may perform adjustments to received graphics in order to project the image 405 formed by the graphics onto the non-perpendicular surface without distortion.

Figure 4B:
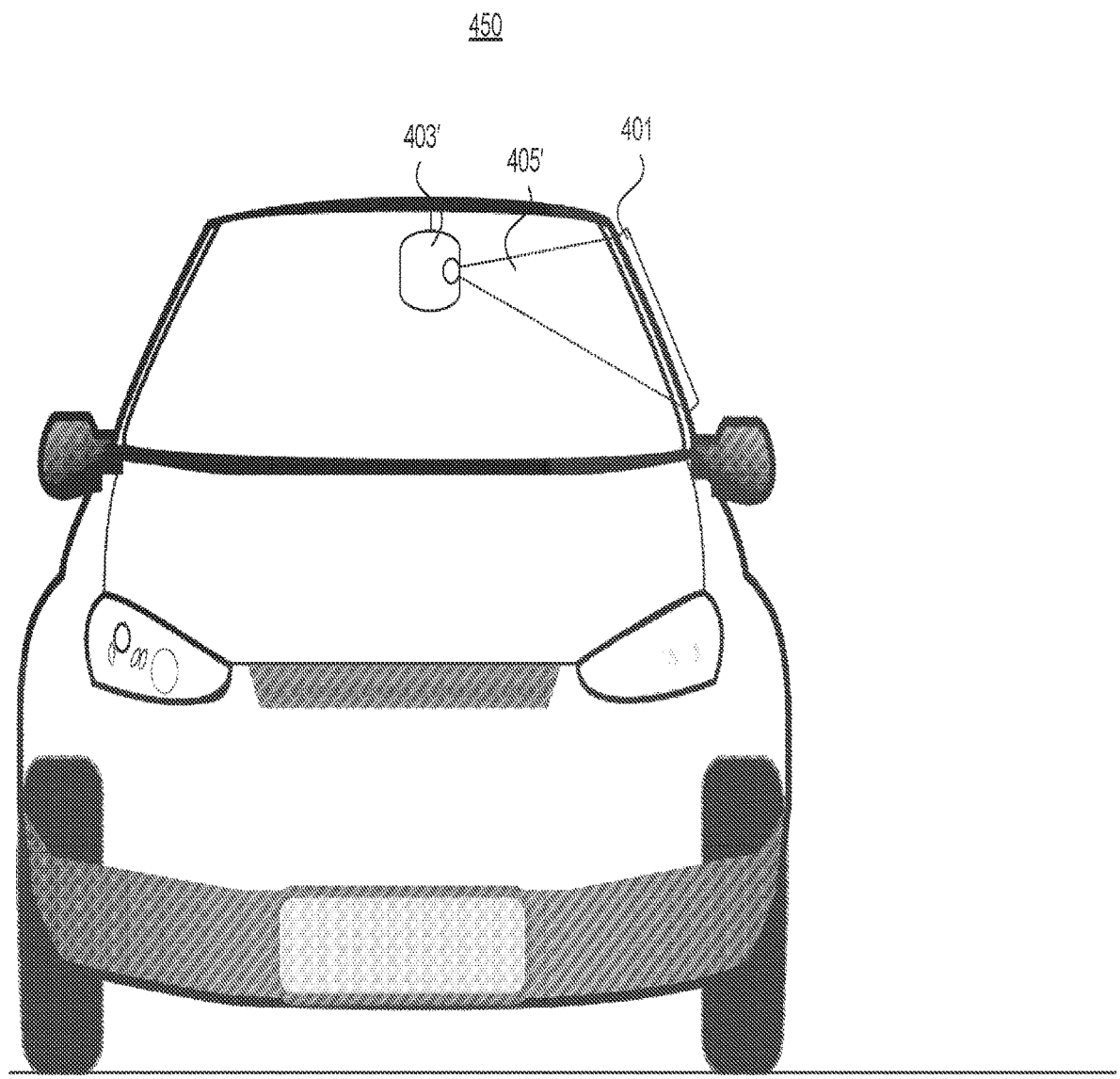
FIG. 4B is a schematic representation of another exemplary interactive projection system used on a vehicle window, consistent with embodiments of the present disclosure.

FIG. 4B is a schematic representation of another example interactive projection system 450 used on a vehicle window. Similar to system 400 of FIG. 4A, in FIG. 4B, film 401 is affixed to a vehicle window, and projector 403' is configured to project to film 401. However, as depicted in FIG. 4B, projector 403' may be located inside the vehicle rather than outside (as depicted in FIG. 4A). Accordingly, projector 403' is configured to perform rear projection rather than front projection. Such a configuration may use a processor of projector 403 to perform adjustments to received graphics in order to project the image 405 formed by the graphics without reversing image 405. Moreover, similar to system 400 of FIG. 4A, in FIG. 4B, the processor of projector 403 may also perform adjustments to received graphics in order to project the image 405 formed by the graphics onto the non-perpendicular surface without distortion.

Although both FIGS. 4A and 4B depict film 401 on the outer surface of the vehicle window, other embodiments may use film 401 affixed to the inner surface of the vehicle window. For example, in some embodiments, an interactive projection system may perform front projection on film 401 affixed to the inner surface of a vehicle window. In other embodiments, an interactive projection system may perform rear projection on film 401 affixed to the inner surface of a vehicle window.

Figure 5:
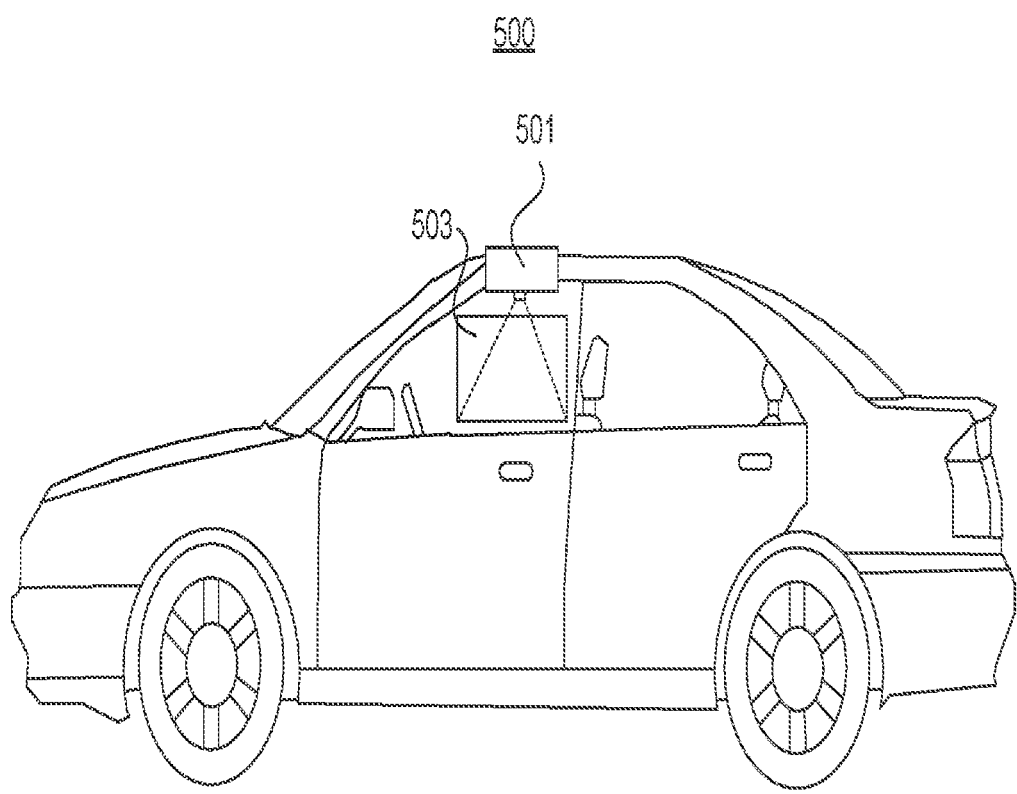
FIG. 5 is a schematic representation of yet another exemplary interactive projection system used on a vehicle window, consistent with embodiments of the present disclosure.

FIG. 5 is another schematic representation of an example interactive projection system 500 used on a vehicle window. As depicted in FIG. 5, film 503 is affixed to a vehicle window. Projector 501 may then be configured to project to film 503. Similar to system 400 and as depicted in FIG. 5, projector 501 may be configured to project an image onto a surface that is not fully perpendicular to the plane of projector. Accordingly, a processor of projector 503 may perform adjustments to received graphics in order to project the image formed by the graphics onto the non-perpendicular surface without distortion.

Figure 6:
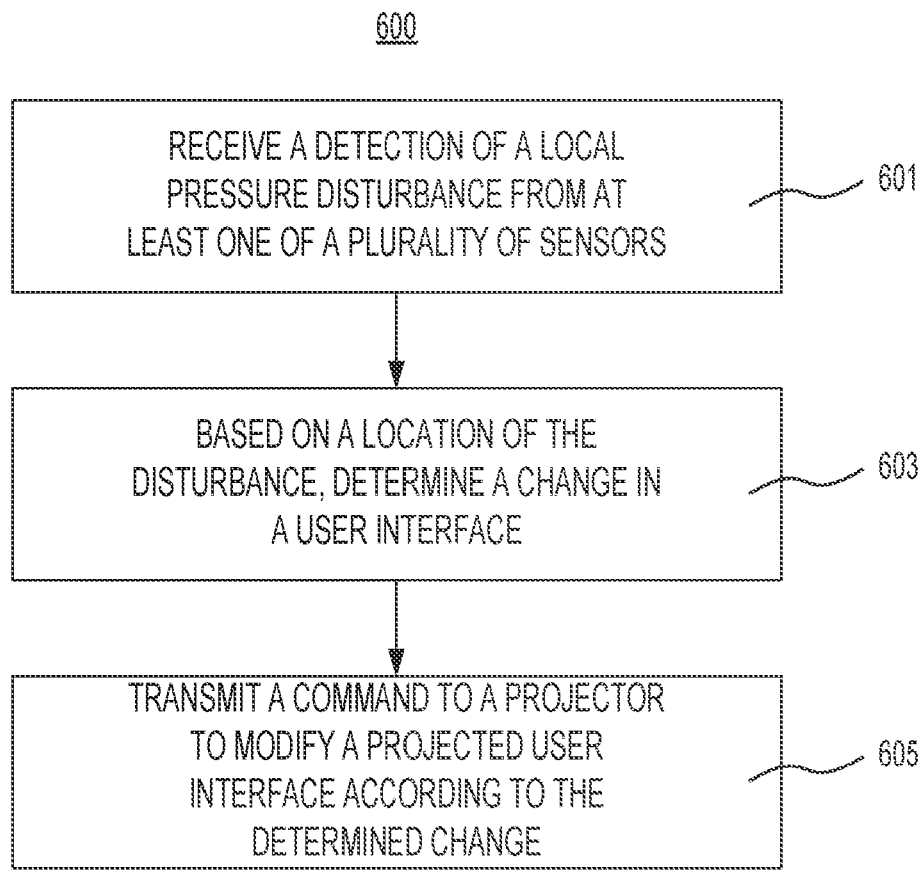
FIG. 6 is a flowchart of an exemplary method for enabling user interaction with a projection system, consistent with embodiments of the present disclosure.

FIG. 6 is a flowchart of exemplary method 600 for enabling user interaction with a projection system. Exemplary method 600 may be implemented by, for example, processor 105 of system 100 of FIG. 1 and/or a microprocessor embedded with a film of system 100 of FIG. 1. Exemplary method 600 may further be implemented using another general-purpose computer or special-purpose computer having at least one processor.

At step 601, the processor may receive a detection of a local pressure disturbance from at least one of a plurality of sensors. For example, the plurality of sensors may be embedded within a film. The detection may be received via a wired connection and/or via a wireless connection.

At step 603, based on a location of the detected local pressure disturbance, the processor may determine a change in a user interface. For example, as explained above, the determined change in the user interface may include a popup window, increasing or decreasing a size of at least one component (for example, a window, a graphic, a text box, a button, or the like) of the user interface, increasing or decreasing a transparency of at least one component of the user interface, changing a color of at least one component of the user interface, adding a new component to or removing a component from the user interface, reorganizing at least one component of the user interface, or the like. In another example, the determined change in the user interface may comprise a replacement user interface.

In some embodiments, the processor may determine the location of the local pressure disturbance based on an identification of the at least one sensor from which the detection is received. For example, as explained above, the location may be determined as at or near a known location of the at least one sensor.

In embodiments where the at least one sensor from which the detection is received includes at least two sensors, determining the location of the local pressure disturbance may be based on an interpolation of local pressures measured by at least two of the plurality of sensors. For example, a weighted average may be used when two sensors send the detection. Similarly, triangulation may be used for embodiments with at least three sensors sending the detection.

In some embodiments, determining the change in the user interface may be based on a change in the location over a period of time. For example, a change in location may be indicative of a user dragging her finger on the user interface, which may result in a different change to the user interface than one or more taps. In such embodiments, determining the change in the user interface may further be based on at least one of a magnitude of the change in location and a magnitude of the period of time. For example, the magnitude of the change in location may be used to determine the change in the user interface if the change in location is indicative of a drag-and-drop motion. In another example, the magnitude of the period of time may be used to determine the change in the user interface if the change in location is indicative of a scrolling motion.

At step 605, the processor may transmit a command to a projector to modify a projected user interface according to the determined change. For example, the processor may transmit the commands including the determined change (e.g., new graphics, new text, new sizes, new transparencies, new user interface, or the like) through a wired connection and/or a wireless connection to the projector.

Figure 7:
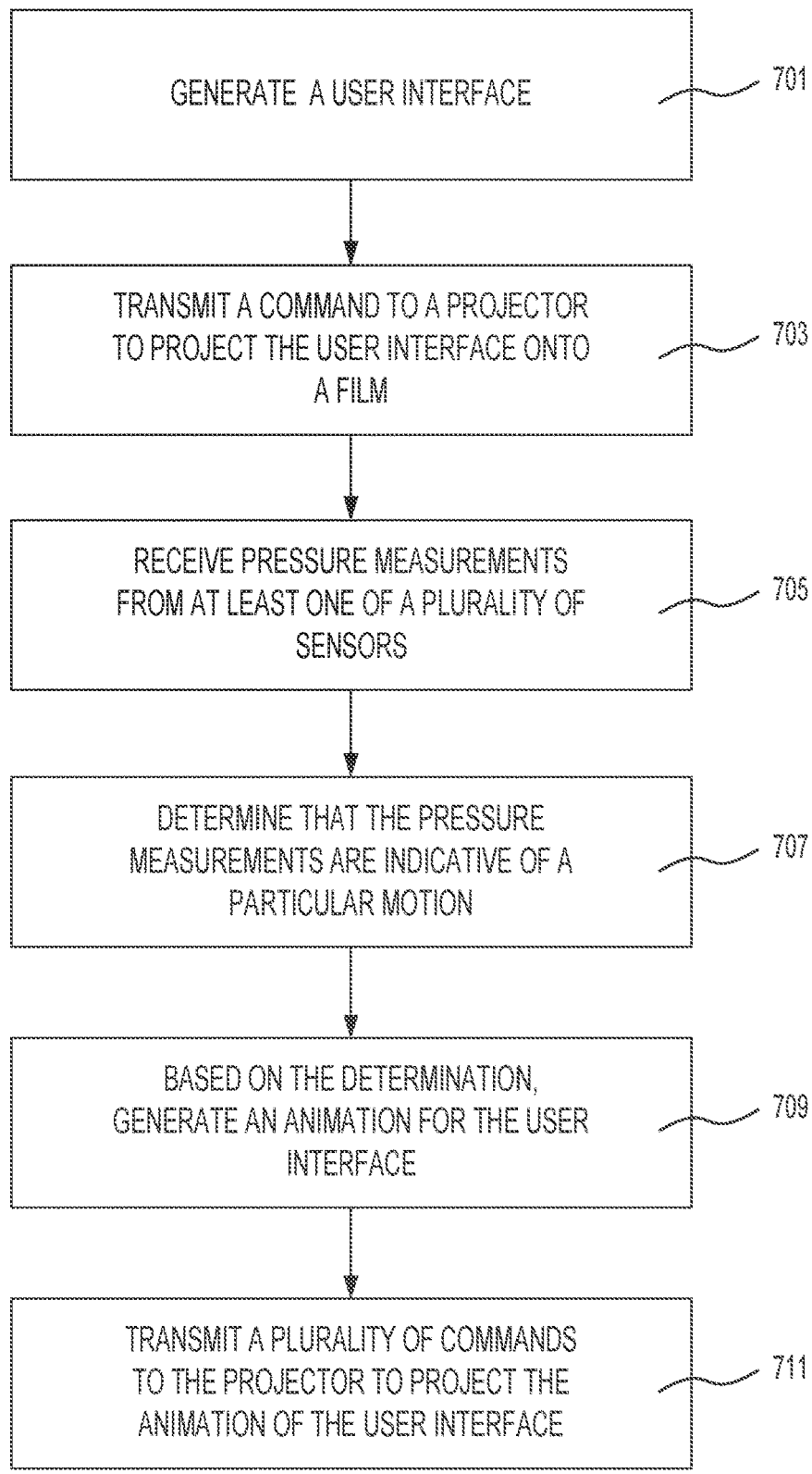
FIG. 7 is a flowchart of an exemplary method for configuring a projection system for animation based on user interaction, consistent with embodiments of the present disclosure.

FIG. 7 is a flowchart of exemplary method 700 for configuring a projection system for animation based on user interaction. Exemplary method 700 may be implemented by, for example, processor 105 of system 100 of FIG. 1 and/or a microprocessor embedded with a film of system 100 of FIG. 1. Exemplary method 700 may further be implemented using another general-purpose computer or special-purpose computer having at least one processor.

At step 701, the processor may generate a user interface. For example, as explained above, the processor may select one or more graphics, text, and the like and organize the selected components into a user interface. The selected components may be retrieved from one or more memories and/or from one or more remote servers.

At step 703, the processor may transmit a command to a projector to project the user interface onto a film. For example, similar to step 605 of method 600, the processor may transmit the command including the generated interface (e.g., graphics, text, sizes thereof, transparencies thereof, or the like) through a wired connection and/or a wireless connection to the projector.

At step 705, the processor may receive pressure measurements from at least one of a plurality of sensors. For example, the plurality of sensors may be embedded within a film. The processor may receive the pressure measurements in a manner similar to the operation of step 601 of method 600, described above.

At step 707, the processor may determine that the pressure measurements are indicative of a particular motion. For example, the particular motion may be a scrolling motion. In such a case, determining that the pressure measurements are indicative of a scrolling motion may be based on spatial changes of the pressure measurements over a period of time. For example, the spatial changes matching a scrolling motion may include changes that are substantially vertically (e.g., within 30 degrees, within 20 degrees, within 10 degrees, or the like of a vertical axis of the film). In addition, the determination may further depend on a magnitude of the period of time. For example, spatial changes over a reasonable period of time (e.g., 500 milliseconds, 1 second, 2 seconds, or the like) may match a scrolling motion. Additionally or alternatively, determining that the pressure measurements are indicative of a scrolling motion may be based on identifying a single approximate center of a local pressure disturbance represented by the pressure measurements.

The spatial changes determined in this example may be spatial changes with respect to one or more localized pressure disturbances. Additionally or alternatively, the spatial changes determined in this example may be spatial changes with respect to a "center of mass" of the sensors. For example, the "center of mass" may be calculated as a weighted average of pressure measurements.

In another example, the particular motion may be zooming motion. In such a case, determining that the pressure measurements are indicative of a zooming motion may be based on spatial changes of the pressure measurements over a period of time. For example, the spatial changes matching a zooming motion may include pressure measurements that move together or apart from each other over the period of time. Additionally, determining that the pressure measurements are indicative of a zooming motion may be further based on a magnitude of the period of time. Additionally or alternatively, determining that the pressure measurements are indicative of a zooming motion may be based on identifying two approximate centers of local pressure disturbances represented by the pressure measurements.

The spatial changes determined in this example may be spatial changes with respect to one or more localized pressure disturbances. Additionally or alternatively, the processor may determine spatial changes in this example based on, e.g., finding clusters of sensors that are near each other and that are experiencing changes using k-means clustering or the like. Statistical techniques for finding anomalies (that is, the changes) may include calculating the sum of squared differences between current sensor readings and previous sensor readings, setting a hard threshold as to what constitutes a pressure disturbance (e.g., a particular pressure value), setting a floating threshold such that any sensor reading over a mean value (or a median value, or the like) constitutes a pressure disturbance, or the like. Any of the examples above may also include lowpass filtering to smooth out aberrations that may occur from signal noise, a two-dimensional filter to cancel out noise from disturbances that are larger than a reasonable size (such as a fingertip), or the like.

At step 709, based on the determination, the processor may generate an animation for the user interface. For example, as explained above, the processor may generate one or more frames, each frame having one or more components forming a user interface, the frames arranged to create the appearance of change from one user interface to another when projected in a sequence in rapid (e.g., 15 frames per second, 30 frames per second, or the like) succession.

At step 711, the processor may transmit a plurality of commands to the projector to project the animation of the user interface. For example, the processor may transmit the commands, each command including a generated frame, through a wired connection and/or a wireless connection to the projector.

Figure 8:
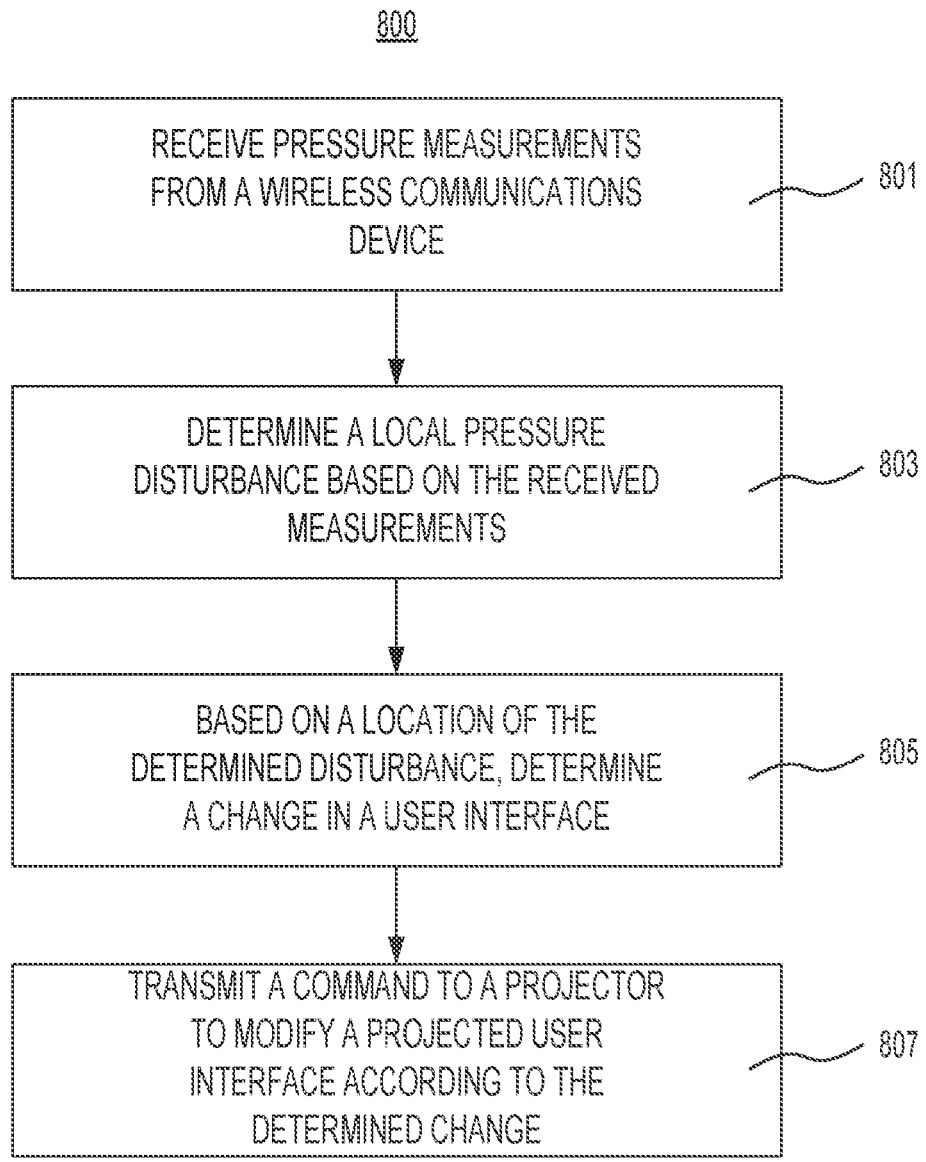
FIG. 8 is a flowchart of another exemplary method for configuring a projection system for user interaction, consistent with embodiments of the present disclosure.

FIG. 8 is a flowchart of exemplary method 800 for configuring a projection system for user interaction. Exemplary method 800 may be implemented by, for example, processor 105 of system 100 of FIG. 1 and/or a microprocessor embedded with a film of system 100 of FIG. 1. Exemplary method 800 may further be implemented using another general-purpose computer or special-purpose computer having at least one processor.

At step 801, the processor may receive pressure measurements from a wireless communications device. For example, the wireless communications device may receive the pressure measurements from a plurality of sensors embedded within a film. In some embodiments, the wireless communications device may also be embedded within the film. In other embodiments, the wireless communications device may be remote from the film and receive the measurements via a wired connection and/or a wireless connection to the sensors.

At step 803, the processor may determine a local pressure disturbance based on the received pressure measurements. For example, the processor may map the measurements to known locations of the sensors on the film and determine the local pressure disturbance based on the map. Additionally or alternatively, the processor may use one or more statistical techniques to determine that one or more measurements are anomalous and thus represent a local pressure disturbance.

At step 805, based on a location of the determined local pressure disturbance, the processor may determine a change in a user interface. For example, step 805 may be performed in a manner similar to the operation of step 603 of method 600, described above.

At step 807, the processor may transmit a command to a projector to modify a projected user interface according to the determined change. For example, step 807 may be performed in a manner similar to the operation of step 605 of method 600, described above.

Figure 9:
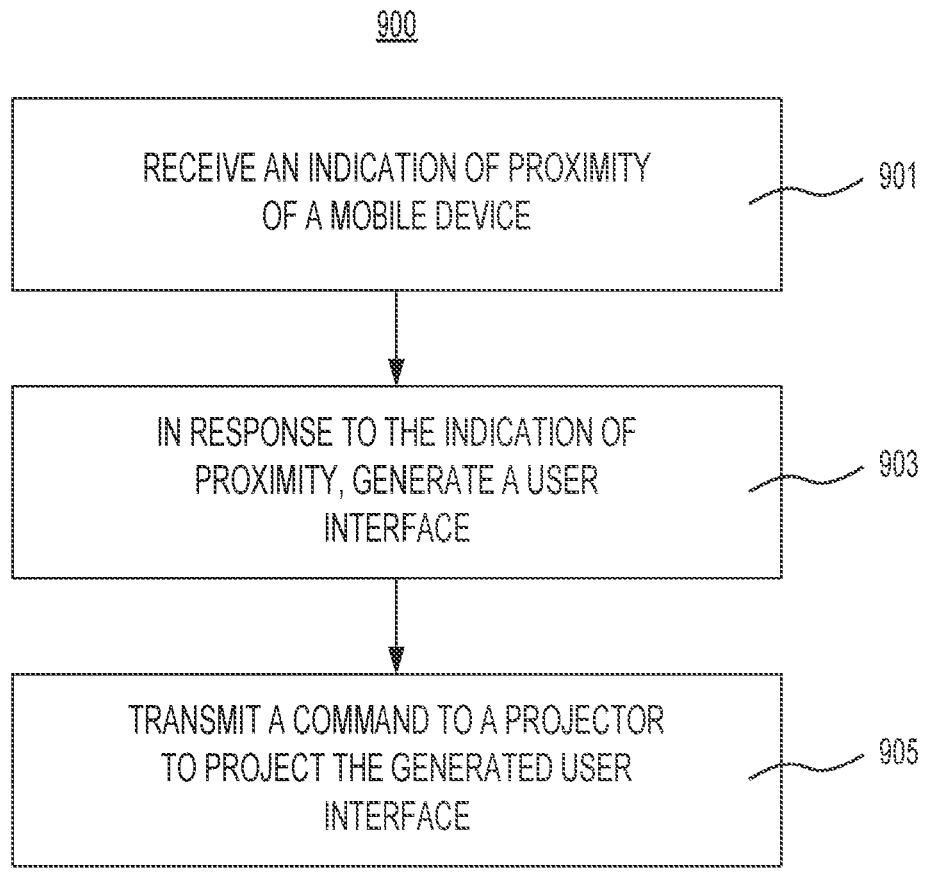
FIG. 9 is a flowchart of an exemplary method for configuring a projection system for proximity-based projection, consistent with embodiments of the present disclosure.

FIG. 9 is a flowchart of exemplary method 900 for configuring a projection system for proximity-based projection. Exemplary method 900 may be implemented by, for example, processor 105 of system 100 of FIG. 1 and/or a microprocessor embedded with a film of system 100 of FIG. 1. Exemplary method 900 may further be implemented using another general-purpose computer or special-purpose computer having at least one processor.

At step 901, the processor may receive an indication of proximity of a mobile device. The processor may receive the indication directly from the mobile device or through an intermediary. For example, an intermediary may include a Wi-Fi (or other wireless networking hotspot) to which the mobile device has connected.

The indication of proximity may include a GPS location of the mobile device. Additionally or alternatively, the indication of proximity may include at least one of a received signal strength, a time of arrival, or an angle of arrival of one or more network signals at the mobile device. Accordingly, the processor may determine a location of the mobile device based on the indication and determine proximity by comparing a distance between the determined location to a predetermined location (e.g., at or near one or more components of system 100) with a threshold (e.g., 30 yards, 10 feet, or the like).

At step 903, in response to the indication of proximity, the processor may generate a user interface. For example, step 903 may be performed in a manner similar to the operation of step 701 of method 700, described above.

At step 905, the processor may transmit a command to a projector to project the generated user interface. For example, step 905 may be performed in a manner similar to the operation of step 703 of method 700, described above. In some embodiments, transmitting the command may be performed in response to the indication of proximity and/or in response to generating the user interface.

Method 900 may further include additional steps. For example, method 900 may further include receive an indication that the mobile device is beyond a proximity threshold. Similar to step 901, the processor may receive the indication directly from the mobile device or through an intermediary.

Similar to the indicator of proximity, the indicator that mobile device is beyond the proximity threshold may include an updated GPS location of the mobile device. Additionally or alternatively, the indication that the mobile device is beyond a proximity threshold may include at least one of an updated received signal strength, an updated time of arrival, or an updated angle of arrival of one or more network signals at the mobile device. Accordingly, the processor may determine an updated location of the mobile device based on the indication and determine that the mobile device is beyond the proximity threshold by comparing a distance between the updated location to a predetermined location (e.g., at or near one or more components of system 100) with the proximity threshold (e.g., 30 yards, 10 feet, or the like).

The processor may be further configured to, in response to the indication that the mobile device is beyond the proximity threshold, transmit a command to the projector to power off. For example, the processor may send the command via a wired connection to the projector and/or via a wireless connection to the projector. In embodiments where the projector is adapted to have a power on mode and a low power mode, the command may be to switch from the power on mode to the low power mode.

Figure 10:
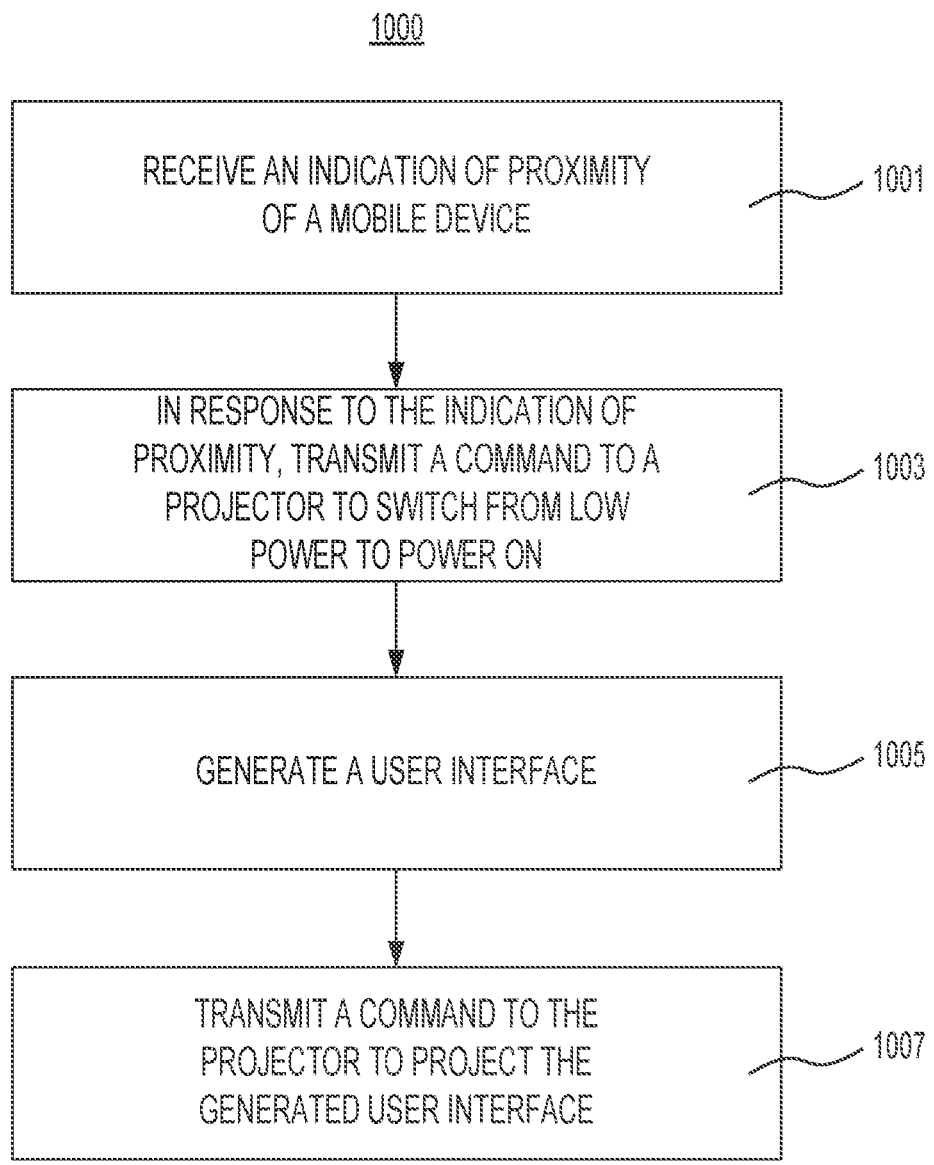
FIG. 10 is a flowchart of an exemplary method for configuring a projection system with proximity-based power control, consistent with embodiments of the present disclosure.

FIG. 10 is a flowchart of exemplary method 1000 for configuring a projection system for proximity-based projection. Exemplary method 1000 may be implemented by, for example, processor 105 of system 100 of FIG. 1 and/or a microprocessor embedded with a film of system 100 of FIG. 1. Exemplary method 1000 may further be implemented using another general-purpose computer or special-purpose computer having at least one processor.

At step 1001, the processor may receive an indication of proximity of a mobile device. For example, step 1001 may be performed in a manner similar to the operation of step 901 of method 900, described above.

At step 1003, in response to the indication of proximity, the processor may transmit a command to a projector to switch from a low power mode to a power on mode. A "low power" mode may comprise a mode in which the projector retains power to one or more components (e.g., processor 305, communications device 307, ventilation system 311, or any combination thereof) and not other components (e.g. illumination 303). Additionally or alternatively, a "low power" mode may comprise a mode in which the projector still projects but with less intensity than in the "power on" mode. The processor may send the command via a wired connection to the projector and/or via a wireless connection to the projector.

At step 1005, the processor may generate a user interface. For example, step 1005 may be performed in a manner similar to the operation of step 903 of method 900, described above. In some embodiments, generating the user interface may be performed in response to the indication of proximity and/or in response to transmitting the command to the projector.

At step 1007, the processor may transmit a command to the projector to project the generated user interface. For example, step 1007 may be performed in a manner similar to the operation of step 905 of method 900, described above.

Method 1000 may further include additional steps. For example, method 1000 may further include receiving an indication that the mobile device is beyond a proximity threshold and, in response to the indication that the mobile device is beyond the proximity threshold, transmitting a command to the projector to switch to the low power mode from the power on mode. For example, these additional steps may be performed in a manner similar to the operation of the additional steps of method 900, described above.

Figure 11:
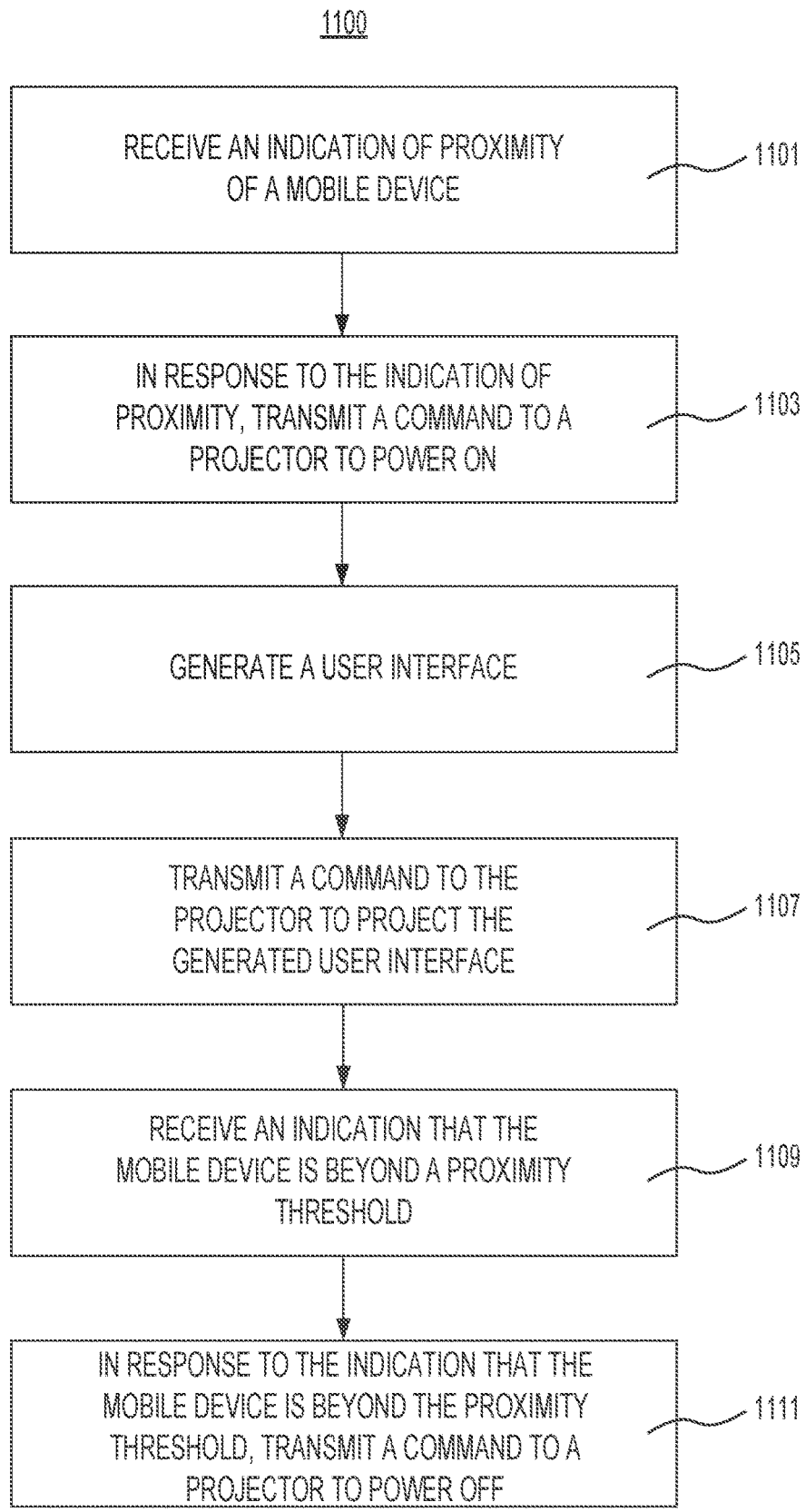
FIG. 11 is a flowchart of another exemplary method for configuring a projection system with proximity-based power control, consistent with embodiments of the present disclosure.

FIG. 11 is a flowchart of exemplary method 1100 for configuring a projection system with proximity-based power control. Exemplary method 1100 may be implemented by, for example, processor 105 of system 100 of FIG. 1 and/or a microprocessor embedded with a film of system 100 of FIG. 1. Exemplary method 1100 may further be implemented using another general-purpose computer or special-purpose computer having at least one processor.

At step 1101, the processor may receive an indication of proximity of a mobile device. For example, step 1101 may be performed in a manner similar to the operation of step 901 of method 900, described above.

At step 1103, in response to the indication of proximity, the processor may transmit a command to the projector to power on. For example, a "power on" mode may comprise a mode in which all components of the projector are powered and/or a mode in which the projector projects but with greater intensity than in the "low power" mode. The processor may send the command via a wired connection to the projector and/or via a wireless connection to the projector. In embodiments where the projector is adapted to have a power on mode and a low power mode, the command may be to switch from the low power mode to the power on mode.

At step 1105, the processor may generate a user interface. For example, step 1105 may be performed in a manner similar to the operation of step 903 of method 900, described above. In some embodiments, generating the user interface may be performed in response to the indication of proximity and/or in response to transmitting the command to the projector.

At step 1107, the processor may transmit a command to a projector to project the generated user interface. For example, step 1107 may be performed in a manner similar to the operation of step 905 of method 900, described above.

At step 1109, the processor may receive an indication that the mobile device is beyond a proximity threshold, in a manner similar to the operation explained above with respect to method 900.

At step 1111, in response to the indication that the mobile device is beyond the proximity threshold, the processor may a command to the projector to power off. For example, a "power off" mode may comprise a mode in which the components of the projector do not receive power. The processor may send the command via a wired connection to the projector and/or via a wireless connection to the projector. In embodiments where the projector is adapted to have a power on mode and a low power mode, the command may be to switch from the power on mode to the low power mode.

Any of methods 900, 1000, and 1100 may be combined with methods 600, 700, and 800 such that the proximity-based projection and/or power control of methods 900, 1000, and/or 1100 may be incorporated into the interactive features of methods 600, 700, and/or 800.

Figure 12:
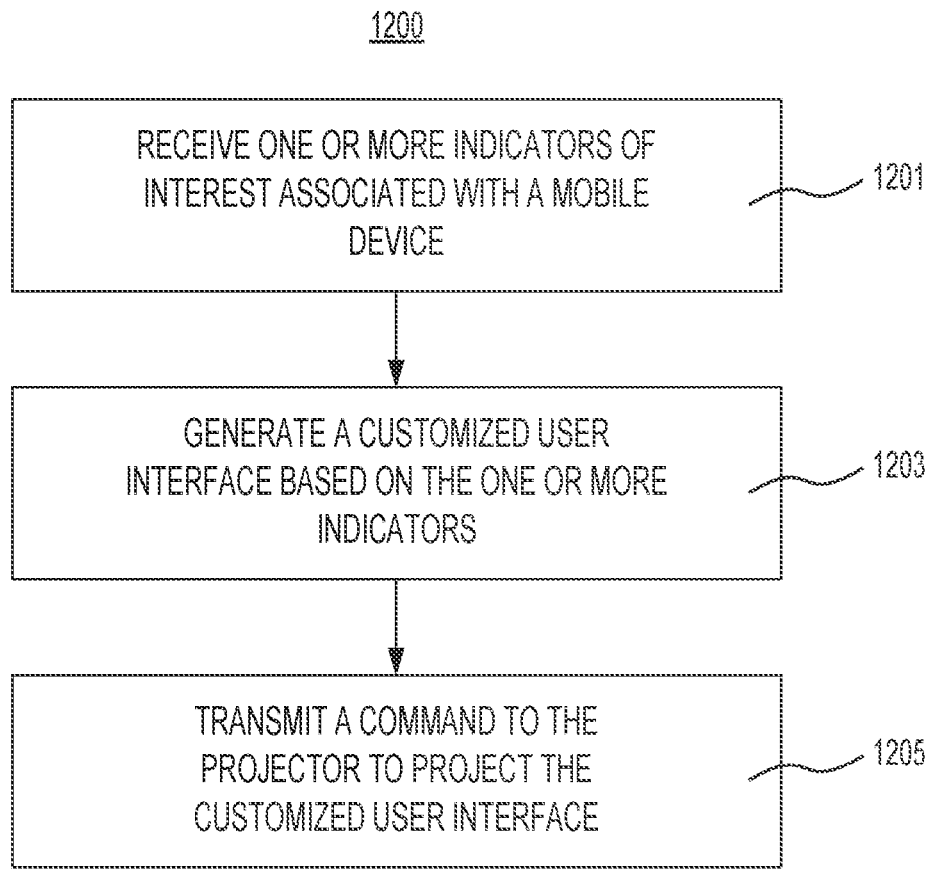
FIG. 12 is a flowchart of an exemplary method for generating a customized user interface for an interactive projection system, consistent with embodiments of the present disclosure.

FIG. 12 is a flowchart of exemplary method 1200 for generating a customized user interface for an interactive projection system. Exemplary method 1200 may be implemented by, for example, processor 105 of system 100 of FIG. 1 and/or a microprocessor embedded with a film of system 100 of FIG. 1. Exemplary method 1200 may further be implemented using another general-purpose computer or special-purpose computer having at least one processor.

At step 1201, the processor may receive one or more indicators of interest associated with a mobile device. For example, the processor may receive the indicators from one or more applications running on the mobile device. Additionally or alternatively, the processor may use an authorization obtained from the mobile device to retrieve the indicators form one or more remote servers. For example, the process may have obtained the authorization from an intermediary, such as a Wi-Fi device (or other wireless networking hotspot), that the mobile device provided upon connecting to the intermediary. For example, the mobile device may provide the authorization as a condition of connecting to the intermediary and/or of receiving access to a network (such as an Internet) through the intermediary.

At step 1203, the processor may generate a customized user interface based on the one or more indicators. For example, as explained above, the processor may select and/or organize one or more components comprising the customized user interface to prioritize components aligned with the indicators of interest. For example, the processor may map the indicators of interest to one or more predetermined profiles having one or more characteristics and may select the components using a relational database indexing characteristics to user interface components. Additionally or alternatively, the processor may determine strength scores for each indicator of interest and then organize the selected components to prioritize those matching indicators with the highest scores.

In some embodiments, the processor may determine one or more automotive preferences based on the one or more indicators and then generate the customized user interface based on the one or more automotive preferences. For example, the one or more automotive preferences may include at least one of gas mileage, horsepower, towing capacity, trunk space, number of seats, and acceleration. As explained above, the indicators may be mapped to one or more automotive preferences, e.g., using a relational database and/or a feature model. Accordingly, generating the customized user interface may be based on the one or more automotive preferences, similar to the generation based on the indicators explained above.

At step 1205, the processor may transmit a command to the projector to project the customized user interface. For example, the processor may transmit the command in a manner similar to the transmission of step 905, described above.

Method 1200 may further include additional steps. For example, method 1200 may further include receiving an indication that the mobile device is beyond a proximity threshold. For example, the processor may receive the indication directly from the mobile device or through an intermediary (e.g., the intermediary used in step 1201, described above).

As explained above, the indication of proximity may include a GPS location of the mobile device. Additionally or alternatively, the indication of proximity may include at least one of a received signal strength, a time of arrival, or an angle of arrival of one or more network signals at the mobile device. Accordingly, the processor may determine a location of the mobile device based on the indication and determine proximity by comparing a distance between the determined location to a predetermined location (e.g., at or near one or more components of system 100) with a threshold (e.g., 30 yards, 10 feet, or the like).

Additionally or alternatively, method 1200 may include receiving a second indication of proximity of a second mobile device. For example, the processor may receive GPS coordinates and/or other positional indicators from which the processor may determine a location of the second mobile device, or may receive the location directly from the second mobile device and may then determine whether the location of the second mobile device is within a particular threshold that may comprise the proximity threshold.

In response to the indication that the mobile device is beyond the proximity threshold and/or in response to the second indication, the processor may generate a default user interface and transmit a command to the projector replace the customized user interface with the default user interface. The "default user interface" may comprise a selection and/or organization of one or more components comprising the customized user interface that is not based on particular indicators of interest (or automotive preferences). For example, the processor may transmit the command in a manner similar to step 1205, described above.

Method 1200 may be combined with any of methods 900, 1000, and/or 1100 such that the generation of customized user interfaces may be combined with the proximity-based projection and/or power control of methods 900, 1000, and/or 1100. Moreover, the customized user interfaces (and/or default user interfaces) described above may be rendered interactive, e.g., by combining method 1200 with any of methods 600, 700, and/or 800.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A projection system, the system comprising:
 a projector configured to project content onto a surface; and
 at least one processor configured to perform operations comprising:
  receiving an indication of proximity from one or more applications running on a plurality of mobile devices;
  determining a proximity distance of one or more of the plurality of mobile devices in relation to the surface or the projector;
  selecting a first mobile device from the plurality of mobile devices, based on the proximity distance;
  receiving one or more indicators of interest associated with the first mobile device and determining one or more automotive preferences based on the one or more indicators, by mapping the one or more indicators of interest to the one or more automotive preferences, determining strength scores for each indicator of interest, and prioritizing indicators of interest with the highest strength scores;
  generating a customized user interface based on the one or more indicators and the one or more automotive preferences;
  transmitting a command to the projector to project the customized user interface;
  receiving a second indication of proximity of a second mobile device;
  in response to the second indication, generating a default user interface; and
  transmitting a command to the projector to replace the customized user interface with the default user interface.

2. The projection system of claim 1, wherein the indication of proximity includes a GPS location of each of the plurality of mobile devices.

3. The projection system of claim 1, wherein the indication of proximity includes at least one of a received signal strength, a time of arrival, or an angle of arrival of one or more network signals at each of the plurality of mobile devices.

4. The projection system of claim 1, wherein the one or more indicators of interest are received directly from the first mobile device.

5. The projection system of claim 1, wherein the one or more indicators of interest are retrieved from a remote server using one or more authorizations received from the first mobile device.

6. The projection system of claim 1, wherein the one or more automotive preferences include at least one of gas mileage, horsepower, towing capacity, trunk space, number of seats, or acceleration.

7. The projection system of claim 1, wherein the operations further comprise:
 receiving an indication that the first mobile device is beyond a proximity threshold,
 in response to the indication that the first mobile device is beyond the proximity threshold, generating a default user interface, and
 transmitting a command to the projector to replace the customized user interface with the default user interface.

8. A projection system, the system comprising:
 a projector adapted to have a power-on mode and a low-power mode and configured to project content onto a surface; and
 at least one processor configured to perform operations comprising:
  receiving an indication of proximity from one or more applications running on a plurality of mobile devices;
  determining a proximity distance and an angle range of one or more of the plurality of mobile devices in relation to the surface or the projector;
  selecting a first mobile device from the plurality of mobile devices, based on a combination of the proximity distance and the angle range;
  receiving one or more indicators of interest associated with the first mobile device and determining one or more automotive preferences based on the one or more indicators, by mapping the one or more indicators of interest to the one or more automotive preferences, determining strength scores for each indicator of interest, and prioritizing indicators of interest with the highest strength scores;
  generating a customized user interface based on the one or more indicators and the one or more automotive preferences;
  transmitting a command to the projector to project the customized user interface; and
  receiving a second indication of proximity of a second mobile device;
  in response to the second indication, generating a default user interface; and
  transmitting a command to the projector to replace the customized user interface with the default user interface.

9. The projection system of claim 8, wherein the indication of proximity includes a GPS location of each of the plurality of mobile devices.

10. The projection system of claim 8, wherein the indication of proximity includes at least one of a received signal strength, a time of arrival, or an angle of arrival of one or more network signals at each of the plurality of mobile devices.

11. The projection system of claim 8, wherein the one or more indicators of interest are retrieved from a remote server using one or more authorizations received from the first mobile device.

12. The projection system of claim 8, wherein the one or more automotive preferences include at least one of gas mileage, horsepower, towing capacity, trunk space, number of seats, or acceleration.

13. The projection system of claim 8, wherein the operations further comprise:
 receiving an indication that the first mobile device is beyond a proximity threshold, and
 in response to the indication that the first mobile device is beyond the proximity threshold, transmitting a command to the projector to switch from the power-on mode to the low-power mode.

14. A projection system, the system comprising:
 a projector; and
 at least one processor configured to perform operations comprising:

receiving an indication of proximity from one or more applications running on a plurality of mobile devices;

determining a proximity distance and an angle range of one or more of the plurality of mobile devices in relation to a surface or the projector;

selecting a first mobile device from the plurality of mobile devices, based on a combination of the proximity distance and the angle range;

receiving one or more indicators of interest associated with the first mobile device and determining one or more automotive preferences based on the one or more indicators, by mapping the one or more indicators of interest to the one or more automotive preferences, determining strength scores for each indicator of interest, and prioritizing indicators of interest with the highest strength scores;

generating a customized user interface based on the one or more indicators and the one or more automotive preferences; and transmitting a command to the projector to project the customized user interface; and receiving a second indication of proximity of a second mobile device;

in response to the second indication, generating a default user interface; and transmitting a command to the projector to replace the customized user interface with the default user interface.

* * * * *